United States Patent
Alter et al.

(10) Patent No.: US 8,566,730 B2
(45) Date of Patent: Oct. 22, 2013

(54) GRAPHICAL USER INTERFACE THAT IDENTIFIES THE REASONS FOR PUBLIC DISAGREEMENTS

(76) Inventors: Daniel B. Alter, Seattle, WA (US); Margaret Milanowski, Seattle, WA (US)

( * ) Notice: Subject to any disclaimer, the term of this patent is extended or adjusted under 35 U.S.C. 154(b) by 1352 days.

(21) Appl. No.: 11/849,258

(22) Filed: Aug. 31, 2007

(65) Prior Publication Data
US 2008/0222537 A1    Sep. 11, 2008

Related U.S. Application Data

(63) Continuation-in-part of application No. 10/423,215, filed on Apr. 25, 2003, now abandoned.

(51) Int. Cl.
G06F 3/00    (2006.01)
(52) U.S. Cl.
USPC ............................ 715/758; 715/752; 709/206
(58) Field of Classification Search
USPC .................................. 715/752, 758; 709/206
See application file for complete search history.

(56) References Cited

U.S. PATENT DOCUMENTS

| | | | | |
|---|---|---|---|---|
| 5,990,887 A * | 11/1999 | Redpath et al. | ............... | 715/758 |
| 6,105,055 A * | 8/2000 | Pizano et al. | ................. | 709/204 |
| 6,122,632 A * | 9/2000 | Botts et al. | ............................ | 1/1 |
| 6,148,290 A * | 11/2000 | Dan et al. | ....................... | 705/304 |
| 6,151,589 A * | 11/2000 | Aggarwal et al. | ........... | 705/36 R |
| 6,336,133 B1 * | 1/2002 | Morris et al. | ................. | 709/204 |
| 6,408,283 B1 * | 6/2002 | Alaia et al. | ....................... | 705/37 |
| 6,484,196 B1 * | 11/2002 | Maurille | ....................... | 709/206 |
| 6,525,747 B1 * | 2/2003 | Bezos | .......................... | 715/751 |
| 6,826,618 B2 * | 11/2004 | Morris et al. | ................. | 709/229 |
| 7,007,166 B1 * | 2/2006 | Moskowitz et al. | .......... | 713/176 |
| 7,124,164 B1 * | 10/2006 | Chemtob | ....................... | 709/204 |
| 7,512,655 B2 * | 3/2009 | Armstrong et al. | ........... | 709/205 |
| 8,161,381 B2 * | 4/2012 | Newman et al. | .............. | 715/255 |
| 8,307,079 B2 * | 11/2012 | Koren | .......................... | 709/224 |
| 2002/0129056 A1 * | 9/2002 | Conant et al. | ................. | 707/511 |
| 2003/0187970 A1 * | 10/2003 | Chase et al. | .................. | 709/223 |

* cited by examiner

*Primary Examiner* — Phenuel Salomon
(74) *Attorney, Agent, or Firm* — Lowe Graham Jones PLLC

(57) ABSTRACT

A single place where all of us can meet on an equal basis 24/7 from anywhere we can reach to, and communicate back from, in the universe is now being built. The present invention is an interface for universal information exchange over a public data network (e.g., Internet). Explicit agreements to Rules of Response are used to cause its users to identify all possible questions and disagreements expressed with symbols through the interface. The result is a universal information exchange that can be used by all as a common meeting point from anywhere to exchange and verify information, answer questions, resolve disagreements, and exchange any combination of goods and services.

3 Claims, 14 Drawing Sheets

| | |
|---|---|
| Public Record Delayed 24 Hours, Open To All | Notifications  Click anywhere in this box to find out what it can do for you, from new responses, notifications, sales by members, ads you select, or just leave it blank. You decide.  For now we are in beta test, so please use the webpage problem link as we need the feedback. We will be restricting membership initially until we are fully functional.  Search For Posts By Username  Search For New Posts Today  Search For Member Websites  Search For Member Classifieds ie: try a search on Dan Alter |
| Vote On Proposals To Resolve Disagreements, Secret Ballot, Open To All | |
| Classified Open To All | |
| Real Time Public Records, Members Only | |
| Member Posts | |
| Member Sell Or Solicit | |
| Private Dialogues, Forums & Communities, Members only | |
| Members Commissions, Overrides & Winning Proposal Fees | |
| Our Books | |

42 — Vote On Proposals To Resolve Disagreements
60 — Classified Open To All

Latest n1cl.net News

A List of Disagreement

List of Proposals Put to Vote

Disclaimer

This is a beta test interface. It is not fully functional. We are not claiming that the n1cl keeps a "permanent public record" yet or perform any other function adequately.

The present purpose is to work the bugs out. Participation

| | |
|---|---|
| Home | Agreements & Contracts |
| Real Time Public Record, Members Only | Agreements<br><br>Agreement to answer anyones questions about what I say, sell, or solicit on the public record of the No 1st Cost List |
| Public Record Delayed 24 Hours, Open To All | Agreement to respond by the N1CL rules of response until I and my questioner have agreed to agree, or agreed to disagree |
| Member Posts | Agreement to be responsible for the consequences, legal and otherwise, of what I say, sell, or solicit on the N1CL public record. |
| Member Sell Or Solicite | Agreement that I can only have one N1CL membership and public address, and that I can not sell them or allow others to use them |
| Member Classified | Agreement to use the N1CL arbitration mechanism with anyone who agrees to use N1CL arbitration for a public N1CL complaint about anything I sold him through the N1CL |
| Vote On Proposals To Resolve Disagreements. secret Ballot. Open To All | Agreement that the N1CL constitution was explained to me and I agree that my use of the N1CL will be regulated by it |
| | Agreement that all financial transactions of the No 1st Cost List will be through the PayPal interface. |
| Private Dialogues & Forums. Members Only | Agreement to uphold the N1CL Copyright |
| | Contracts |
| Members Commissions, Overrides & Winning Proposal Fees | No 1st Cost List Constitution<br><br>No 1st Cost List trust<br><br>Fixed allocations from gross Revenues<br><br>Beta Test Team Funding |
| The Financials & Other Measures | Beta Test Team Member<br><br>Member Application<br><br>Administrator<br><br>Webmaster<br><br>Sales/Trainer<br><br>Accountant<br><br>Interface Programmer |

FIG.3 no1stcostlist.com

The ONLY verified with *public Challenges from Anyone internet information exchange.*

▽October 24, 2006, 3:51 pm | Welcome dan1 | N1CL Homepage △

▽Main Menu

- 🏠 Home
- ▢ Contact Us
- ▢ News
- ▢ Submit News
- ▢ Surveys
- ▢ Table of Contents
- ▢ Tell a Friend

Members options
- ▢ My Account
- ▢ My Private Messages
- ▢ PayPal Payment

Forums
- ▢ Community Forums

Community
- ▢ Groups
- ▢ Photo Gallery

Search
- ▢ Coppermine
- ▢ Forums
- ▢ Search

Web
- ▢ Statistics

▽User Info

No 1 st Cost List

Anyone can be a member! Anyone can ask a question or ask for help For Free!

Resister to "No/Yes"(Warn, Dispute Public Facts, Not-recommend/Recommend0,FOR FREE!

Help Verify Who Keeps Their Word!

TO QUESTION A MEMBER: You and the member agree to respond in turn until you explicitly agree or disagree giving reason(s).

To End a Question & Answer(Q&A) Dialogue: EITHER can check 'this in my last response'; which the OTHER can accept by not replying, OR after stating reason(s) checks 'I Disagree'.

Changing a 'not-reply acceptance' to a 'I disagree' must be done first upon your next N1CL logon.

A Question must be about whats on the member's N1CL public record.

Non-Members can not be asked questions on the N1CL record about their questions and responses; but anyone can question their "No/Yes"s.

The N1CL Interface's Best Feature

The Automatic Consequence giving users the Public workload each can handle: Unless your Dialogues are current; the N1CL Interface automatically blocks you from asking or being asked a new question.

The clock starts ticking when the N1CL sends you a notification e-mail. Staying Current is a reply before the third 12PM GMT strickes after notification, or by mutual agreement; your sabbath, national holidays plus weekends excepted. The block is automatically removed when your Q&A Dialogues become current.

Show Your Honesty To All By Becoming A Member

Question a Member-'No/Yes' person | Apply for Betamembership

Posted on Thursday, May 12

Public Record of the No 1st Cost List(N1CL)

FIG.4

No 1st Cost List

The ONLY _verified_ with *public challenges* from *Anyone* internet _information_ exchange.

- Home Operations Page
- Register
- Community Forms
- Member Forums

▽ Registration Agreement Terms
Welcome Anonymous

▽ User Info

Welcome Anonymous

| | |
|---|---|
| Nickname | dan1 |
| Password | ******** |
| (Register) | Login |

Membership:
- Latest: mahendra
- New Today: 0
- New Yesterday: 0
- Overall: 2

People Online:
- Members: 0
- Visitors: 1
- Total: 1

Who Is Where:
- Visitors:
01: Your Account

Staff Online:

*No staff members are online!*

▽ Main Menu
- Home
- Contact Us
- News

By clicking Registration below you agree to be bound by these conditions.

I Agree to these terms and am over or exactly 13 years of age

I agree to these terms and am under 13 years of age

I do not agree to these terms

Button Links ▽

- ✈ DRAGONFLY
- XML SYNDICATE
- W3C CSS
- W3C XHTML 1

FIG.5 no1stcostlist.com

The ONLY verified with *public challenges*
*from Anyone* internet information exchange.

△Registration Agreement Terms
October 24,2006, 4:07 pm | Welcome Anonymous | N1CL Homeage Application For Asking a Question, or Full Membership in the No 1st Cost List(N1CL)

*The four upper conditions apply to everyone's use of the N1CL*

I, the undersigned, understand that my use of the N1CL will be governed by these four(4) conditions.

1. There is no charge for asking a question, nor will there ever be.

2. I agree to respond on the Public Record of the N1CL, in turn to a member's responses to my questions,
     until we reach an agreement to agree on their answer, or disagree with a reason; using the
     N1CL agree/diaagree mechanism provided.
     a. I understand that no one can ask me a question using the public N1CL Question & Answer(Q&A) procedure
       about what I ask or say to a member during a Q&A dialogue; unless I am a full N1CL member.
     b. I understand that I can not post to the N1CL Public Record, except to ask a question and respond
       in turn during a dialogue I am party to; unless I become a full N1CL member.

3. I will abide by all underlying licensing, usage, and acceptable use policies required for use of the N1CL.
     a. I understand that I can use the non-member forums and open to all features of the N1CL
       as long as I abide by these four(4) conditions. Some may have a charge in the future.

4. When I agree to use the arbitration mechanism of the N1CL; I will
  accept its decision as final, and seek on other legal remedy.

| First Name | | Middle | |
|---|---|---|---|
| Last Name | | Phone# | |
| Email Address | | | |
| Street Address | | | |
| City | | State | | Country |
| Zip | | Birthplace | | Sex   Male |
| Place of Birth | | | |

FIG.6

☐ I Accept
Submit

*The six(6) conditions below apply only to those who agree to become full voting N1CL Members.*

1. I agree to answer questions from anyone who asks using the Public N1CL Q&A procedure, about what I say, sell, or solicit
   on the Public Record of the N1CL, and I will respond in turn to them, until we reach an agreement to agree, or disagree
   with a reason, about my answer(s); using the N1CL agree/disagree procedure provided.

2. I agree to abide by the N1CL constitution, acceptable use policies, usage, licensing agreements and any other
   constraints and agreements that affect my membership, or any changes in them arrived at during Beta, or in them by
   N1CL constitutional procedures thereafter.

3. I agree to use the N1CL arbitration mechanism for complaints from anyone about anything I have sold, solicited, or
   agreed to do with them, that was done on the N1CL Public Record; as long as they have agreed to accept N1CL arbitration.

4. The penalties for violating that above conditions can be delisting as a full voting member for up to seven(7) years;
   and the N1CL default fund will pay the amount of any N1CL arbitration decision against you, up to the amount
   of your legally available net worth, or 10% of the default fund, whichever is smaller.
   (This default condition will not apply until we have $100,000 in the default fund.)

5. The N1CL voting membership fee(including Beta) is one hundred($100), plus any applicable taxes
   and transaction fees, and is non-refundable.

6. An existing full N1CL member must verify who you are within 90 days after you use a visa, mastercard, or paypal account with
   your name and address, OR two full N1CL members can sign you up; OR you agree to fax NOTARIZED ID papers to N1CL
   206 417 3883 (USA) within 30 days of signing up;   Upon receipt of this fax, we will credit your account with $20.

COPYRIGHT 2005 No 1st Cost List, Patent Pending
The logos and trademarks used on this site are the property of their respective owners
We are not responsible for comments posted by our users, as they are the property of the poster.
Anyone is free to read, copy, reprint, incorporate or pass on to others in any form the material put on the
No 1st Cost List public record without charges for public and private benefit. Before charging above actual
standards copying expense, except for accepted 'fair use', you must arrange terms of compensation with the
author(s).
Interactive software released under GNU CPL, Code Credits, Privacy Policy

FIG. 7

This is what the page looks like. Above is the topic review box so you can read down the posts in the order they were posted. Below are the checkboxes.

When you check "this is my last response", then your reply turns gray.

Then the other p[arty, sees two new checkboxes, "I agree" and "I diagree". Check "I agree" and your reply is colored green.

Check "I disagree" and your reply is colored red.

Options
HTML is <u>OFF</u>
BBCode is <u>ON</u>
Smilies are <u>ON</u>

☐ This is my last response
☐ Disable BBCode in this post
☐ Disable Smilies in this post
☑ Attach signature (signatures can be changed in profile)
☑ Notify me when a reply is posted
Post topic as: ⦿Normal ◯Sticky ◯Announcement Add an Attachment If you do not want to add an Attachment to your Post, please leave the Fields blank
<u>Allowed Extensions and Sizes</u>

Filename [          ] [ Browes... ]

GRAPHICAL USER INTERFACE THAT IDENTIFIES THE REASONS FOR PUBLIC DISAGREEMENTS

PRIORITY CLAIM

This application is a Continuation-in-Part of U.S. patent application Ser. No. 10/423,215 filed Apr. 25, 2003 now abandoned.

BACKGROUND OF THE INVENTION

Open to the public universal scientific information exchanges. Real scientists must want a place where we all can meet to disagree on an equal basis. This want is implied by the method required by the objective purpose of science; which is to discover and create a perfect logical picture of reality that we can verify by measures of cause and effect we all can see. These logical structures are called theory(s).

Therefore, logical and observations discrepancies are necessarily what must be used to improve theories. Since scientifically acquired knowledge is for all of us, this requires a place where all possible observers can disagree with each other on an equal basis. This is not how it works in science now.

The theoretical basis for this invention rises out of neoclassical economic theory. This theory's framework of analysis describes logically how any possible kind of 'affect' impacts the Quantity of Goods and Services exchanged. This theory is used to define what constraints and physical requirements are needed to build an optimal "Marketplace" for all possible kinds of exchanges over an Internet. Fundamentally these constraints imply that a single physical place can exist that is common to all exchanges.

Theoretical Premise: It can be shown that in a conserved system like an Internet with a finite number of nodes (users) at any time; then there can only be one place where all possible users can meet to disagree at anyone lime, about anything expressed with symbols, e.g. a central switching point in a phone system.

Since time immemorial mankind has unconsciously sought to create a common single meeting place open 24/7 to exchange information and ideas, resolve disagreements, and to exchange all other goods and services from anywhere any of us might be, instantly.

The concept of a common to all meeting place to resolve problems and exchange goods and services is as old as organized societies. In small tribal societies all could meet in the 'town square'. For larger societies these meetings started with annual or seasonal markets or fairs and over time evolved into markets open year round.

Political meeting places naturally evolved from the public councils of a tribe. The ancient Greek public square where all citizens could meet to discuss and vote on public problems is an example. The New England town meetings are another example.

These political meeting places all had major structural problems. In all of these examples, access was restricted to a small group of privileged people called citizens. They had to rely on essentially face to face contacts. Naturally, those best at small group discussions dominated.

The next problem was that there literally could be no real accurate permanent record of what was said. Instead people had to rely on their fallible memories. Even with writing, the best we could do was shorthand notes made by a secretary. As the Greeks learned, without an accurate record, large groups of people were easily swayed by demagogues and sophists who worked for special interests. With no accurate records, facts and memories could easily be twisted to the advantage of the powerful who had learned from experience to avoid open disagreements.

Suppressing disagreements about the terms of exchange in markets for physical Goods & Services meant such markets would not survive. So, over time, marketplaces necessarily began to reflect some of the logical characteristics of an ideal meeting place for exchange, i.e. a single place where all participants had equal access to the same information affecting these exchanges at the same time, e.g. prices. The problem here was that simultaneity meant that publishing had to be done in a limited physical space so all participants could see and hear one another at the same time.

Exchanging pre-defined goods and services is simple however, compared to exchanging scientific, political, social and other ideas and information. For example, for political discussions we have evolved inconvenient public meetings, conventions, elected representatives to legislatures, and open to the public proposal techniques for citizens to put referendum and initiatives to a vote.

However, putting a referendum or an initiative on the ballot is not easy. A single person, small group, or even relatively large group with a valid complaint or idea will find out that it is very costly in time and money to be heard. This cost, by inspection, eliminates a large number of proposals.

The reason insiders in political, business, and scientific arenas want to block objections to their behavior, policies, and ideas is simple. It is against their personal or group interests. They block disagreements by using three basic techniques:

First, members of establishments see, hear, and speak no evil about each other's mistakes and crimes; ignore disagreements with what they do and say; or when they must respond, they change the subject; or when pushed, they call you names.

Second, they establish expensive, time consuming, multi-step procedures to winnow out the vast majority of objections, e.g. public hearings held at times and places where only paid lobbyists can afford to attend.

Third, there are the pushy ones, who can use all forms of verbal and physical intimidation like getting you fired, physical threats, beatings, and up to murder.

The three reasons they get away with this in public forums are simple:

First, all sides of an issue want to win, so they do not want to explicitly and willingly identify what the other side is disagreeing with them about.

Second, there is no easy to use central public place to record disagreements with insiders or others. With no central public place to record objections on a permanent public record, insiders don't have to respond and so they don't. Its human self interest in action.

Third, no one points out these tactics as I just did above in public. It is necessary to explain what a not do is avoiding identifying disagreements, before you can show or point out to others what these tactics are when they are being used.

Minimizing open disagreements is basic human nature. We are social animals who like to be liked. This makes it especially easy for those who control the "forum" involved, to automatically ignore someone, talk over others, or change the subject.

The Internet when used to conduct public discussions fails to work. Its how public chat rooms and forums are controlled. They use many of the same techniques described above to avoid resolving disagreements. In them, the users are usually anonymous and there is, in my experience, no real verification of who anyone really is. While these "discussions" are usually moderated, no one ever has to reach an agreement to agree or disagree in them. Further, there are almost always exclusionary rules that can be arbitrarily applied by the owners or moderators of these forums to those who are "disagreeable". These forums have no Rules of Response.

SUMMARY OF THE INVENTION

The present invention provides special interests, where any one can register disagreements with one another and track how we resolve them.

Such a universal information exchange has never existed before; because it was impossible to build without an Internet or the discovery of the theoretical premise that defines that it can logically exist.

The present invention is an interface for universal information exchange over a public data network (e.g., Internet). Explicit agreements to Rules of Response are used to cause its users to identify all possible questions and disagreements expressed with symbols through the interface. The result is a universal information exchange that can be used by all as a common meeting point from anywhere to exchange and verify information, answer questions, resolve disagreements, and exchange any combination of goods and services.

Accordingly, besides the objects and advantages of the Public Disagreement Dialogue Internet Interface described above, several objects and advantages are:

(a) a permanent public written record of what members say, sell, or solicit through the interface and of the Dialogues that result;

(b) a system that identifies which people, businesses, and organizations will stand behind what they say, sell, or solicit anywhere on the planet;

(c) a unique permanent privately owned public address;

(d) a system that creates a universal message tree where one can contact another 24/7 from anywhere that the Internet can be accessed;

(e) a system that creates a relatively safe way to criticize powerful people with anonymity;

(f) a clear sharp boundary between public and private exchanges of information which allows frank dialogues before committing to a public record;

(g) a system that identifies logical observational discrepancies in scientific theories;

(h) a system that enables us to create software that remembers your answers to questions so you only have to answer a question once;

(i) businesses and organizations have a single place where people can go to ask questions and get answers 24/7;

(j) a new kind of newspaper whose reporters have agreed to answer questions from anyone about what they report;

(k) a new way to resolve publicly identified disagreements by letting anyone submit proposals to resolve disagreements to a paid public vote, proceeds divided up among the winners by pre-determined formula;

(l) a system that identifies public problems early while they are still small.

Further objects and advantages will come out of using this interface. For example, it suggests some economical ways of controlling spam like only accepting solicitations from members and/or requiring that there be a one click un-subscribe button. With time and experience many new and novel uses will appear.

BRIEF DESCRIPTION OF THE DRAWINGS

Preferred and alternative examples of the present invention are described in detail below with reference to the following drawings:

FIGS. 1-14 are screen shots of a web-based user interface for allowing inter party communication in accordance with an embodiment of the present invention.

DETAILED DESCRIPTION

An embodiment of the present invention includes a website generated by a computer-based server. The website is accessible by users at other computers over a public data network (e.g., Internet). The website provides an interface that allows users to challenge other user's statements according to specified rules.

The heart of the present invention includes a list of people who will agree to answer questions from anyone about what they say, sell, or solicit via the user (website) interface, and the agreement to respond to one another until they reach an agreement to agree or disagree. The process described below outlines how the interface is used to embody this Public Disagreement Dialogue Interface so that members can respond fairly and economically to the questions they receive.

Figure 1:

A preferred embodiment is demonstrated by web pages 30, 40 that are shown in FIGS. 1 and 2. The web pages 30, 40 include buttons (hyperlink) that lead new users through sign-up procedures that take them trough the agreements and application for membership. Activation of a button 32 ("New Questioners register here") on web page 30 takes any new potential user through a log-in script that identifies them (valid e-mail address required); has them sign a dialogue agreement, and then asks them for which member they want to ask a question of. Once they identify a member, they are led to the member's dialogues and asked to cite specifically which of the member's dialogues they wish to pose a question. Then, they enter a question. The entered question is then recorded. Once the question is recorded, both the member and the questioner will receive an e-mail confirmation of the question and a restatement of the Rules of Response.

Figure 9:
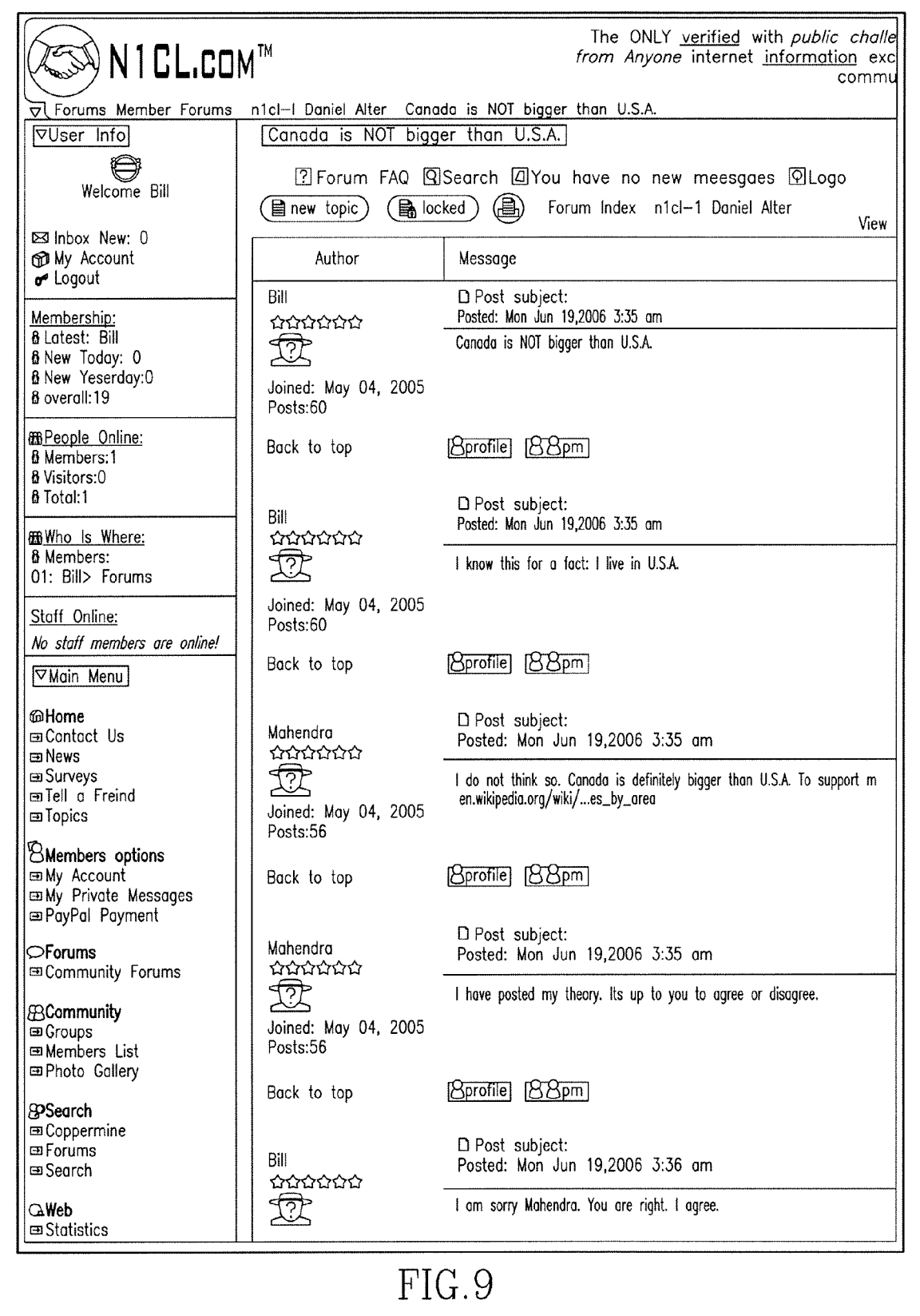
Figure 10:
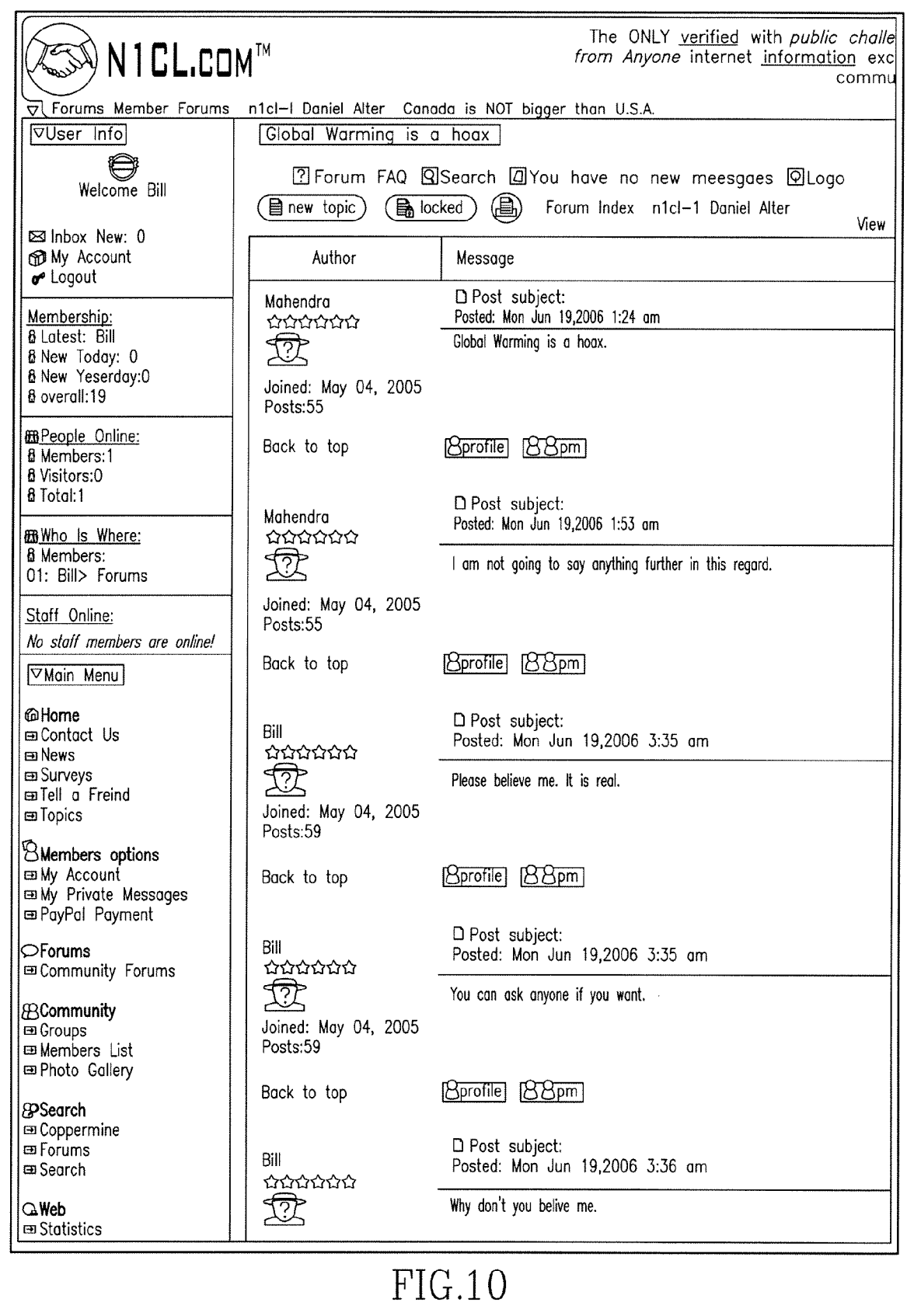
Figure 11:
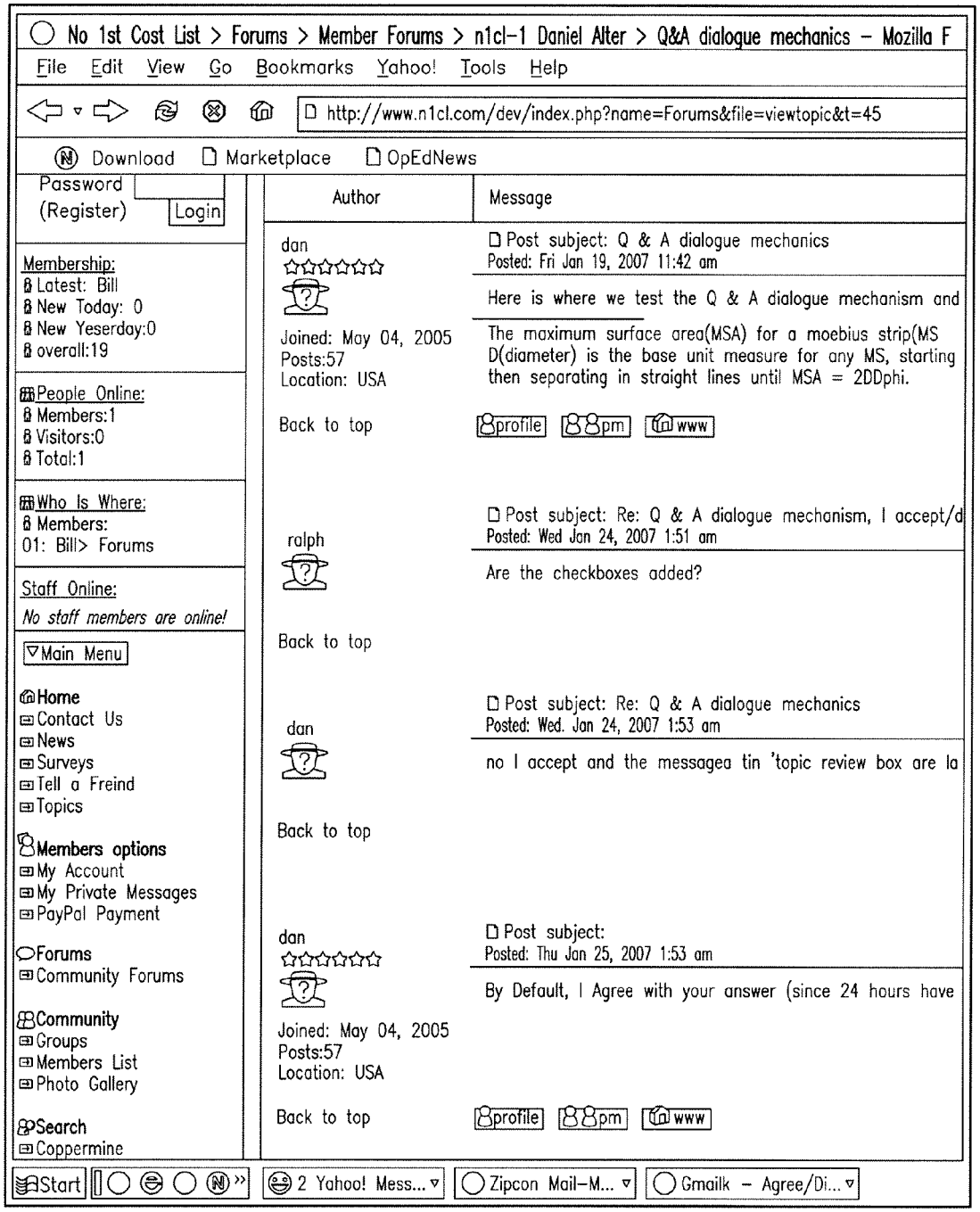
Figure 12:

After a member receives a question that is listed on a public file for that member (e.g., FIGS. 9-11), that member has a predefined amount of time (e.g., 24 hours) to answer the question after reviewing/downloading. Once reviewed/downloaded, the questioner receives a notification (e-mail) of reviewing/downloading.

The member may not cherry pick questions. They must answer them in the order received/downloaded, except that when receiving/downloading more than one at a time, then they have the predefined amount of time (e.g., 24 hours) to respond in any order to those questions. Any response including "I need more time," with the time limit set is acceptable. If the time limit is considered unreasonable, then there is an appeal process both parties have agreed to. The loser of an appeal pays any appeal costs. By inspection, anyone who agrees to answer questions from anyone will exhibit good will or they will quickly lose their reputation for veracity.

Other functions provided by the interface include:

(a) central file. each member and user has their own personal file where copies of all their interactions through the list are kept, e.g. a copy of all e-mail notices and reminders;

(b) permanent public memory, both, user files and the Public Record require a database to remember what is said one another;

(c) members are assigned a unique public address.

(d) using self-selected 10 characteristics;

(e) complete free speech: No prior restraint of any kind except where legally compelled.

(f) anonymous physical location: The system does not need to know where a user is to verify who the user is when they have permanent public address (Internet address). Criticism can be dangerous, especially of bad leaders;

(g) privately owned public address: This requirement is directly implied by function (f);

(h) privately owned by its members: This prevents any government or other organization from blocking criticism of itself or those people or organizations it favors;

(i) members can not sell their membership or public address in the system;

(j) automatic verification and notification of what is placed on the record to the parties involved in an exchange or addressed;

(k) automatic software notifications to remind a user of where they are in dialogues and in any other necessary places required to use the system;

(l) automatic enforcement and notification of Rules of Response, e.g. when users do not respond in time the user cannot use the list for anything else until they do respond.

(m) a database that remembers user answers to questions;

(n) classified advertising section 60; see "Classified Open to All" button, bottom column of buttons, 3rd from top on web page 40;

(o) secure, private file space owned by members; (to do)

(p) value added for members; members can see changes to the interface in real time, non-members after a delay (e.g., 24 hour) unless they pay for the "news". Also members can have web-sites on the interface (business or private), non-members can only list in classified;

(q) legal staff paid from earmarked revenues to enforce the interface agreements and default fund, and to protect our rights to free speech everywhere, see application.

An additional embodiment is shown in FIG. 2 by the second button/hyperlink 42 labeled "Vote on Proposals to Resolve Disagreements. Secret Ballot. Open to All." This use can only exist after disagreements are identified in public.

Another embodiment is the Interface News which reports the disagreements identified and other news reports by members who, of course, have agreed to respond to questions about their reports.

From the description above, a number of advantages become evident:

(a) A massive reduction in the cost of verifying logical and observational discrepancies in scientific theories: With a central meeting place to register disagreements with present scientific theories and models, the scientific journals that use anonymous referees and peer reviews to block disagreements with existing theories will have to change their ways.

(b) The clear sharp boundary between public and private exchanges of information.

(c) Veracity, how do you prove it? The only real is to be willing to open yourself up to public criticism from everyone. This enables any of us who want to, to do so; especially anyone who claims to be a scientist; our stated purpose demands no less.

(d) Protect oneself against unjust or false accusations. The interface lets people defend themselves against false and unjust public accusations, which under our present system are often very expensive to challenge. Eventually the existence of the interface will force an accuser to speak on the record where they can be challenged and forced to respond. With it we can both prove our veracity and protect ourselves against unjust accusations.

(e) Catches public problems while they are still small.

(f) A universal message tree. Everyone at some time has lost contact with someone else and wished they had agreed on a single place they could both go to re-establish contact. This creates a single place people can meet 24/7.

(g) A list of previously answered questions in one place. What an economy for businesses. After a period of time, businesses will accumulate answers to almost all conceivable questions from "hours of operation" to "who does what" to "where are you at", in one place, saving everyone the pain of endless phone menus and businesses the time spent answering many repetitive questions. Which creates a;

(h) New kind of business directory, that can really explain what a business does through its own self-created list of answers to its customers and others questions.

(i) A permanent, central memory for our civilization.

These are some advantages created by this interface, there are more, and many more will be realized through actual use by its members and users.

The operation of the interface is neatly divided into two areas:

The member/user and the building and the control and administration of the interface. Both sides meet at the web-site. For a member/user, it starts with an application for membership and proceeds until their ID is verified and their public address is permanently granted. After they are a member they answer questions that start public dialogues.

Non-members only have to have a valid e-mail address and agree to the Rules of Response. They can not answer questions from anyone but the member who is party to their dialogue.

Included are:

(a) A constitution that prescribes how the members will control the interface in the future and that which describes which aspects of the interface can not be changed. For example, members can not sell or transfer their membership or sell or transfer the ownership of the interface from its members in perpetuity.

(b) A buy/sell agreement to transfer ownership from the inventor/owners to the members.

(c) A published plan for building, operating, and transferring ownership of the interface to its members.

(d) An agreement by members/owners that they will maintain the "specs" of the interface in perpetuity resolving disagreements on a one member one vote basis.

The present invention lowers the cost of exchange in many areas by orders magnitude. This implies an economic flowering for the whole planet.

The next consequence is scientific, by publicly discussing our theoretical disagreements in real time means an enormous increase in scientific advances in many areas.

The first political consequence is that the interface be used by us to ask governments to explicitly vote that these two words define what a crime is: Striking First. All our legal systems past and present already assume these two words to define what a crime is. These two words define what a crime is unconsciously, no one likes to be struck first. We just haven't agreed out loud for the whole planet. Once we do, then we can call ourselves civilized.

What must be done to create this "List"?

It requires two agreements: First, all voting members agree to answer any question from anyone who verifies who they are, about what the member says, sells, or solicits through this internet interface, second, all members and users must agree that they will respond in turn to one another until they agree to 'agree or disagree' on the answer to a question put to a member about what they say, sell, or solicit through the interface.

The interface lets subsets of all users and members conduct dialogues privately or publicly using the same interface.

As shown in FIG. 4, the server performs an automatic blocking out of a first user/member, if they have not satisfactorily responded to a notification (email) within the predefined time limit. The notification is produced when a second user/member has responded to a post (post, sell, solicit) or question of the first user/member. The block does not allow the first user/member reply to any posts or other pending questions. Also, the block may stop other users/members from replying to any posts or other pending questions of the first user/member. A block is cleared once the first user/member has responded to the pending response entered by the second user/member.

The interface also allows one to view previous dialogues that have ended in agreement or disagreement (see FIG. 1). Also, users can present proposals that presented to all or a subset of user for voting.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A non-transitory computer-readable medium having instruction that when executed by a processor generate a graphical user interface, the graphical user interface comprising:
   a computer-based server;
       a first component configured to allow a registered member (a first party) to post at least one of a statement, an item for sale, or a solicitation;
       a second component configured to allow at least one registered member or non-member (a second party) to submit a query or a reply to the posted at least one statement, item for sale, or solicitation, wherein the first and second parties have previously agreed to continue a dialogue associated with the submitted queries or replies until both parties to the dialogue agree to agree or disagree;
   a third component for publicly posting the posted at least one statement, item for sale, or solicitation and associated queries and replies;
   a fourth component configured to automatically block the first or second party from performing all other communications except for a communication that relates to an unresponded to query or reply entered by the other party of the dialogue, if the first or second party has not replied to the unresponded to query or reply entered by the other party of the dialogue within a predefined time limit,
   wherein the fourth component removes the block once the first or second party replies to the unresponded to query or reply entered by the other party of the dialogue;
   a fifth component configured to allow at least one of the parties to end the dialogue, wherein the fifth component presents the first or second party with a choice of agree or disagree if the first or second party has chosen to end the dialogue, if the first or second party selects disagree and enters a reason before the dialogue is ended,
   wherein the fifth component ends the dialogue when either party in the dialogue selects a last response identifier, and the other party does not reply ('no-reply acceptance') or submits a reason with a disagreement response selection;
   wherein the fifth component is further configured to allow a change of a previously designated 'no-reply acceptance' to a 'I disagree' response as a first action upon a next logon of the associated party.

2. The interface of claim 1, wherein only registered members can post at least one of a statement, an item for sale, or a solicitation.

3. The interface of claim 1, further comprising a sixth component for storing communications associated with all dialogues.

* * * * *